(12) United States Patent
Kim et al.

(10) Patent No.: US 11,590,925 B2
(45) Date of Patent: Feb. 28, 2023

(54) ADAS-LINKED ACTIVE HOOD APPARATUS AND METHOD OF CONTROLLING THE SAME

(71) Applicants: Hyundai Motor Company, Seoul (KR); Kia Motors Corporation, Seoul (KR)

(72) Inventors: Sang Il Kim, Gyeonggi-do (KR); Eun Cheol Hong, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 300 days.

(21) Appl. No.: 16/438,033

(22) Filed: Jun. 11, 2019

(65) Prior Publication Data

US 2020/0198572 A1 Jun. 25, 2020

(30) Foreign Application Priority Data

Dec. 19, 2018 (KR) .................. 10-2018-0164669

(51) Int. Cl.
 *B60R 21/38* (2011.01)
 *B60W 50/00* (2006.01)
 *B60W 40/02* (2006.01)
 *G08G 1/16* (2006.01)
 (Continued)

(52) U.S. Cl.
 CPC ............. *B60R 21/38* (2013.01); *B60W 40/02* (2013.01); *B60W 50/0098* (2013.01); *G06V 20/58* (2022.01); *G06V 40/103* (2022.01); *G08G 1/166* (2013.01); *B60W 2554/00* (2020.02)

(58) Field of Classification Search
 CPC .............. B60R 21/0134; B60R 21/38; B60W 2554/00; B60W 40/02; B60W 50/0098; G06V 20/56; G06V 20/58; G06V 40/103; G08G 1/166
 See application file for complete search history.

(56) References Cited

U.S. PATENT DOCUMENTS

2009/0292422 A1* 11/2009 Eiswerth ................. F42B 33/06
 701/45
2010/0063676 A1 3/2010 Ito

FOREIGN PATENT DOCUMENTS

JP 2000326808 A 11/2000
JP 2009196490 A 9/2009
JP 2015058862 A * 3/2015
 (Continued)

*Primary Examiner* — Maceeh Anwari
*Assistant Examiner* — Aarron E Santos
(74) *Attorney, Agent, or Firm* — Fox Rothschild LLP (57) ABSTRACT

An ADAS-linked active hood apparatus includes an ADAS device that measures information regarding a driving state of a vehicle and an object and a collision sensor unit that is positioned at a front of the vehicle and measures collision with the object. An active hood lift system (AHLS) raises one end of a hood of the vehicle based on a signal from the collision sensor unit. A controller sets a pedestrian detection threshold (PDT) turn, receives information regarding a plurality of front objects from the ADAS device to compensate for a PDT, compensates for an output reference value of the collision sensor unit based on the compensated PDT, and determines whether collision occurs using the collision sensor unit to adjust pop-up of the AHLS when an output value equal to or greater than the compensated reference value is applied.

10 Claims, 6 Drawing Sheets

(51) Int. Cl.
     *G06V 20/58*         (2022.01)
     *G06V 40/10*         (2022.01)

(56) References Cited

FOREIGN PATENT DOCUMENTS

| | | | |
|---|---|---|---|
| JP | 2015147556 A | | 8/2015 |
| JP | 2016068901 A | | 5/2016 |
| JP | 2016130108 A | | 7/2016 |
| KR | 20050121328 A | * | 12/2005 |
| KR | 101510011 B1 | | 4/2015 |
| WO | WO-2018225420 A1 | * 12/2018 | ......... B60R 21/0134 |

\* cited by examiner

ADAS-LINKED ACTIVE HOOD APPARATUS AND METHOD OF CONTROLLING THE SAME

CROSS-REFERENCE TO RELATED APPLICATION

This application claims under 35 U.S.C. § 119(a) the benefit of priority to Korean Patent Application No. 10-2018-0164669 filed on Dec. 19, 2018, the entire contents of which are incorporated herein by reference.

BACKGROUND

(a) Technical Field

The present disclosure relates to an advanced driving assistance system (ADAS)-linked active hood apparatus, and more particularly to an ADAS-linked active hood apparatus that includes a controller for receiving ADAS information and compensating for an output value of a sensor unit that performs pop-up of an active hood in consideration of a time to collision (TTC) with the object, a type of a collision object, and the like, which are received from the ADAS, and a method of controlling the same.

(b) Background Art

With the recent advancement of technology for autonomous vehicles, research regarding safety associated with active or passive autonomous driving is being conducted. Moreover, an advanced driving assistance system (ADAS) is being developed as a technology for performing autonomous driving of vehicles.

An ADAS is a high-tech driver assistance system for assisting a driver in operating a vehicle, and is configured to sense a situation ahead of a vehicle, determine the situation based on the sensing result, and control the behavior of the vehicle based on the determined situation. For example, an ADAS sensor device detects a foregoing vehicle and recognizes road lanes. Then, when a target lane, a target speed, or a foregoing target is determined, the ADAS controls, for example, electrical stability control (ESC) of a vehicle, an engine management system (EMS), or motor driven power steering (MDPS).

As a representative example, the ADAS may be realized by an automatic parking system, a low-speed urban driving assistance system, or a blind-spot warning system. The ADAS sensor device for sensing a situation ahead of the vehicle may be, for example, a global positioning system (GPS) sensor, a laser scanner, a front radar, or a Lidar, the most representative one being a front camera configured to capture an image of the area ahead of the vehicle.

Separate from the technology for autonomous driving, recently, an active hood device has been developed as a hood hinge device, which connects opposite side portions of the rear end of a vehicle hood to a vehicle body. When a collision with a pedestrian occurs, the active hood device is capable of preventing the pedestrian's head from directly colliding with a rigid vehicle structure such as an engine or a transmission. However, according to the prior art, an active hood device is configured to perform pop-up irrespective of an object type, and thus, a hood pops up causing excessive repair cost even when a collision object is not a vehicle or a pedestrian.

SUMMARY

In one aspect, the present disclosure provides an advanced driving assistance system (ADAS)-linked active hood apparatus for compensating for a reference value of a collision sensor unit for performing pop-up of an active hood based on a collision object in conjunction with an advanced driving assistance system (ADAS). In another aspect, the present disclosure provides an ADAS-linked active hood apparatus for setting an order of collision objects based on received information regarding an object in conjunction with an ADAS to more accurately operate an active hood lift system (AHLS).

The objects according to the present disclosure are not limited to the objects as mentioned above, and other unmentioned objects will be understood by those skilled in the art from the following description and will be more clearly appreciated by the exemplary embodiments according to the present disclosure. In addition, the object according to the present disclosure may be realized by devices disclosed in the claims and combinations thereof.

The ADAS-linked active hood apparatus and a method of controlling the same for the aforementioned objectives according to the present disclosure may have the following configuration. In an exemplary embodiment, an advanced driving assistance system (ADAS)-linked active hood apparatus may include an ADAS device configured to measure information regarding a driving state of a vehicle and an object, a collision sensor unit positioned in front of the vehicle and configured to measure whether collision with the object occurs, an active hood lift system (AHLS) configured to raise one end of a hood of the vehicle according to a signal from the collision sensor unit, and a controller configured to set a pedestrian detection threshold (PDT) turn, receive information regarding a plurality of front objects from the ADAS device to compensate for a PDT, compensate for an output reference value of the collision sensor unit based on the compensated PDT, and determine whether collision occurs using the collision sensor unit to adjust pop-up of the AHLS when an output value equal to or greater than the compensated reference value is applied.

In another exemplary embodiment, the ADAS device may be configured to calculate a time to collision (TTC) taken to predicted collision with the measured object and detect a distance to the measured object. In still another exemplary embodiment, the controller may be configured to compensate for the PDT using at least one piece of information of a predicted collision order measured by the ADAS device, vehicle speed after compensation, a position of an object in a lateral direction, and an object type. The collision sensor unit may include at least one of an optical fiber sensor and a contact sensor that are installed in a bumper back beam of the vehicle.

Additionally, the AHLS may include a driver to which driving force is applied, and the driver may be operated to permit the hood of the vehicle to pop-up or be restored in a vertical direction by the controller. The controller may be configured to decrease (e.g. alleviate) the output reference value of the collision sensor unit in response to recognizing a pedestrian as the object, and may be configured to increase (e.g., reinforce) the output reference value of the collision sensor unit in response to recognizing a non-pedestrian as the object.

In another further exemplary embodiment, a method of controlling an advanced driving assistance system (ADAS)-linked active hood apparatus may include determining whether an operation condition of an active hood lift system (AHLS) is satisfied, based on a driving state of a vehicle, by a controller, setting a time to collision (TTC) to an object and a pedestrian detection threshold (PDT) using an ADAS device in the operation condition of the AHLS, compensating for the PDT using information received through the ADAS device, determining whether collision occurs, and adjusting pop-up of the active hood, by the controller, when collision occurs.

The compensating for the PDT may further include compensating for a reference value of a collision sensor unit based on the compensated PDT. Additionally, in the compensating for the reference value of the collision sensor unit based on the compensated PDT, the controller may be configured to decrease an output reference value of the collision sensor unit in response to recognizing a pedestrian as the object, and may be configured to increase the output reference value of the collision sensor unit in response to recognizing a non-pedestrian as the object. In the adjusting pop-up of the AHLS, the controller may be configured to adjust a pop-up amount of the active hood based on a collision object measured using the ADAS device.

BRIEF DESCRIPTION OF THE DRAWINGS

The above and other features of the present disclosure will now be described in detail with reference to exemplary embodiments thereof illustrated in the accompanying drawings which are given hereinbelow by way of illustration only, and thus are not limitative of the present disclosure, and wherein.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments according to the present disclosure will be described in more detail with reference to the accompanying drawings. The exemplary embodiments according to the present disclosure may be modified in various forms, and the scope according to the present disclosure should not be interpreted as being limited to the following embodiments. The exemplary embodiments are provided to more completely describe the disclosure to those of ordinary skill in the art.

In addition, in this specification, the upward direction (height direction) is the direction in which a hood is moved upward and the downward direction is the direction in which the hood is moved downward, and the upward and downward directions are relative concepts based on the position of a vehicle. In addition, an active hood lift system (AHLS) 200 disclosed in this specification may be located on at least one end of a hood, and may be configured to be applied to any of various other positions. A pedestrian detection threshold (PDT) disclosed in this specification is a reference for determining similarity with a pedestrian master waveform that is previously obtained from pedestrian leg model sensing estimation and is configured to have an upper limit value and a lower limit value.

Figure 1:
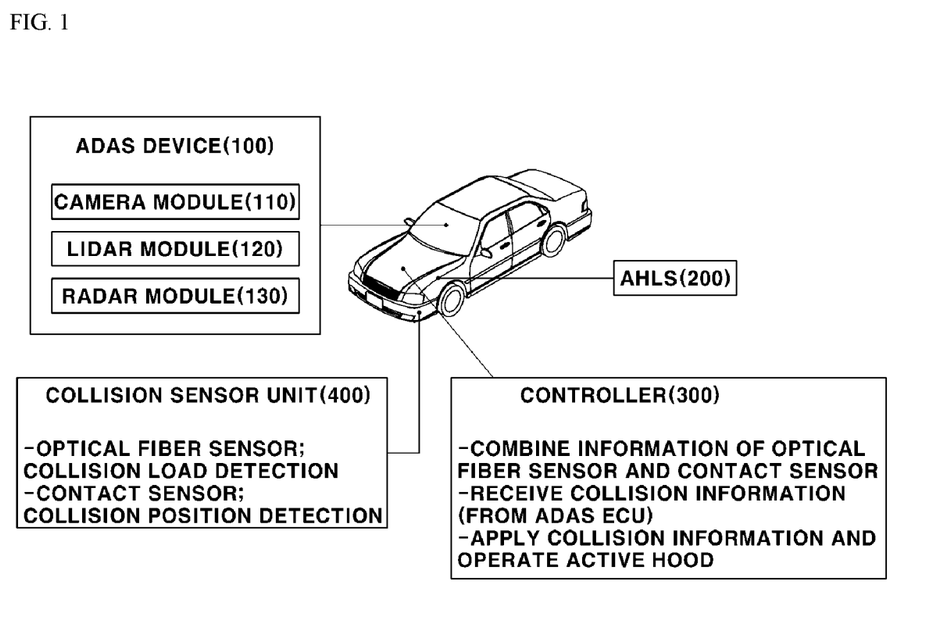
FIG. 1 is a diagram showing the configuration of an advanced driving assistance system (ADAS)-linked active hood apparatus according to an exemplary embodiment of the present disclosure.

FIG. 1 is a diagram showing the configuration of an advanced driving assistance system (ADAS)-linked active hood apparatus 10 according to an exemplary embodiment of the present disclosure. As shown in the drawing, the ADAS-linked active hood apparatus 10 according to the present disclosure may include an ADAS device 100 configured to measure a driving environment, determine whether an object is present in a driving state, and calculate a time to collision (TTC) with the object, a collision sensor unit 400 positioned in front of a vehicle and configured to measure collision with an object, and an active hood lift system (AHLS) 200 having one end in a length direction of a vehicle hood, which pops-up or is restored to an original position in conjunction with collision when collision with the vehicle occurs.

The AHLS 200 according to the present disclosure may include a driver operated by a controller 300 and may be configured to adjust a pop-up amount and a restoration amount of the AHLS 200 based on an operation amount of the driver. In addition, the AHLS 200 may include a gunpowder type actuator to perform one-time pop-up. The ADAS-linked active hood apparatus 10 may include the controller 300 configured to receive the measured information from the ADAS device 100, calculate the TTC, and compensate for a pedestrian detection threshold (PDT) in the ADAS device 100 based on the received information and the TTC.

Further, the controller 300 according to the present disclosure may be configured to compensate for the set PDT with a margin value based on at least one of the information received from the ADAS device 100, that is, a predicted collision order (which may be calculated based on the TTC), vehicle speed after compensation (vehicle speed immediately before collision or relative speed with collision object), a position of an object in a lateral direction, and an object type (pedestrian or non-pedestrian). A reliability level of the ADAS device 100 may be configured to be set based on a driving environment of a vehicle and may be applied to compensate for the PDT. In other words, the controller 300 may be configured to compensate for the PDT with the margin value, with which the PDP is compensated according to the reliability level of the ADAS device 100, consideration of the reliability level.

According to an exemplary embodiment of the present disclosure, the reliability level of the ADAS device 100 may be set to 60%. Differently therefrom, according to another exemplary embodiment of the present disclosure, in an auto light state of a vehicle, the reliability level of the ADAS device 100 may be set to 50% in a light-on state, and the reliability level of the ADAS device 100 may be set to 100% in a driving environment in which a light is turned off.

Accordingly, with regard to the margin value that is preset in the controller 300 and used to compensate for the PDT, 50% of the margin value may be applied to compensate for the PDT in a light-on state and the entire margin value may be applied to compensate for the PDT in a driving environment in which a light is turned off. The information measured using the ADAS device 100 may be used to determine the margin value for compensating for the PDT, and may be used to compensate for a set value of the PDT based on an object with collision possibility by applying information received through the ADAS device 100.

In particular, factors that influence on the reliability level of the ADAS device 100 according to the present disclosure, that is, the amount of rainwater measured using a rain sensor, examination information of an ADAS system, a level at which a vehicle speed is compensated for, and so on may be further considered to set the reliability level of the ADAS device 100. In addition, the controller 300 may be configured to compensate for an output reference value of the collision sensor unit 400 based on the calculated and compensated PDT, and thus, the controller 300 may be configured to apply information regarding an object type, a reliability level of the ADAS device 100, and the like to compensate for the reference value of the collision sensor unit 400 to perform an operation of an AHLS.

In other words, according to the present disclosure, the AHLS 200 may be configured to pop-up based on a sensor value measured by the collision sensor unit 400, and thus, the controller 300 may be configured to set a predicted collision object, compensate for the PDT based on the set object, and compensate for an output reference value of the collision sensor unit 400 based on the compensated PDT, and thus, the AHLS 200 may be configured to more easily pop-up with respect to a pedestrian. Differently therefrom, in response to estimating that a predicted collision object is not a pedestrian (non-pedestrian), the controller 300 may be configured to compensate for the output reference value of the collision sensor unit 400 to be decreased and may be configured to operate the AHLS 200 only when an output value applied according to impact is less than the compensated output reference value.

When impact, which is not matched with the compensated PDT obtained by compensation with the information received from the ADAS device 100, is applied to a vehicle, the compensated PDT may apply an initial setting value, and the reference value of the collision sensor unit 400 may also apply an initial reference value. Accordingly, the controller 300 may be configured to compensate for the PDT according to the object information received from the ADAS device 100, check an object predicted by the controller 300 and a position at which collision is predicted to occur when actual collision occurs, and may be configured to apply the compensated PDT and the compensated reference value of the collision sensor unit 400 when collision based on PDT compensation occurs. When predicted collision base on PDT compensation set by the controller does not occur, the initial value of the PDT and the reference value of the collision sensor unit 400 may be applied to determine driving of the AHLS 200.

In the ADAS device 100 according to the present disclosure, an image sensor may be configured to sense an image of a subject captured via a lens, an image processor may be configured to receive and process data of the captured image from the image sensor, and the camera module 110 may be configured to receive the data from the image processor. The camera module 110 may be configured to operate the image sensor and the image processor, and examples of this control may include power supply control, reset control, clock (CLK) control, data communication control, power source control, and memory control. The image processor may be configured to process data, which is sensed and output by the image sensor, and examples of this processing may include enlargement of a sensed forward object and focusing on the area of an object in the entire visual-field area.

The Lidar module 120 of the ADAS device 100 may be connected, for example, to a Lidar device as a sensor. The Lidar device may include a laser transmission module, a laser detection module, a signal collection and processing module, and a data transmission and reception module, and may use a laser source which emits a laser within a wavelength range from about 250 nm to 11 μm or is capable of changing the wavelength of a laser. The Lidar device may be divided into a time-of-flight (TOF) type and a phase-shift type according to a signal modulation method.

Particularly, the Lidar module 120 may be configured to operate the Lidar device and any other device connected to the Lidar device (e.g. a Lidar processor (not illustrated) that processes a Lidar sensing output). Examples of this control may include power supply control, reset control, clock (CLK) control, data communication control, and memory control. The Lidar device may be used to sense an area or environment ahead of a vehicle. Accordingly, the Lidar device may be positioned on the front side of a passenger compartment, specifically, under a windshield to transmit and receive a laser through the windshield.

The radar module 130 of the ADAS device 100 may be connected, for example, to a radar device as a sensor. The radar device may be a sensor configured to measure the distance to an object or the speed or angle of the object using electromagnetic waves. Through the use of the radar device, an object up to about 150 m ahead within a horizontal angular range of about 30 degrees may be sensed using frequency modulation carrier waves (FMCW) or pulse carrier waves. The radar module 130 may be configured to operate the radar device and any other device connected to the radar device (e.g. a radar processor (not illustrated) that processes a radar sensing output). Examples of this control may include power supply control, reset control, clock (CLK) control, data communication control, and memory control. The radar device may typically use a band of about 77 GHz or any other appropriate band, and may be configured to sense an area ahead of the vehicle. The radar processor may be configured to process data, which is sensed and output by the radar device, and examples of this processing may include enlargement of a sensed forward object and focusing on the area of an object in the entire visual-field area.

As described above, the ADAS device 100 may include the camera module 110, the Lidar module 120, and the radar module 130, each of which may be configured to process received data, and the processed data may be transmitted to the controller 300. The ADAS device 100 according to the present disclosure may be configured to measure whether an object is present on a driving path using the camera module 110, the Lidar module 120, and the radar module 130, and determine relative speed of the object, a position of the object in a lateral direction, a position of a sensor unit, which contacts a vehicle, a time to collision (TTC), and whether the measured object is a pedestrian or an object that is not a pedestrian.

The controller 300 may be configured to calculate the TTC and the compensated PDT based on the information of the ADAS device 100 of the specified object, and in detail, the controller 300 may be configured to calculate the TTC based on a distance to an object and current speed of the object to a time taken to reach collision with each object, and may be configured to calculate the compensated PDT by setting a margin value using information received from the ADAS device 100 and applying the reliability level of the ADAS device 100 to the set margin value to compensate for the PDT.

Figure 2:
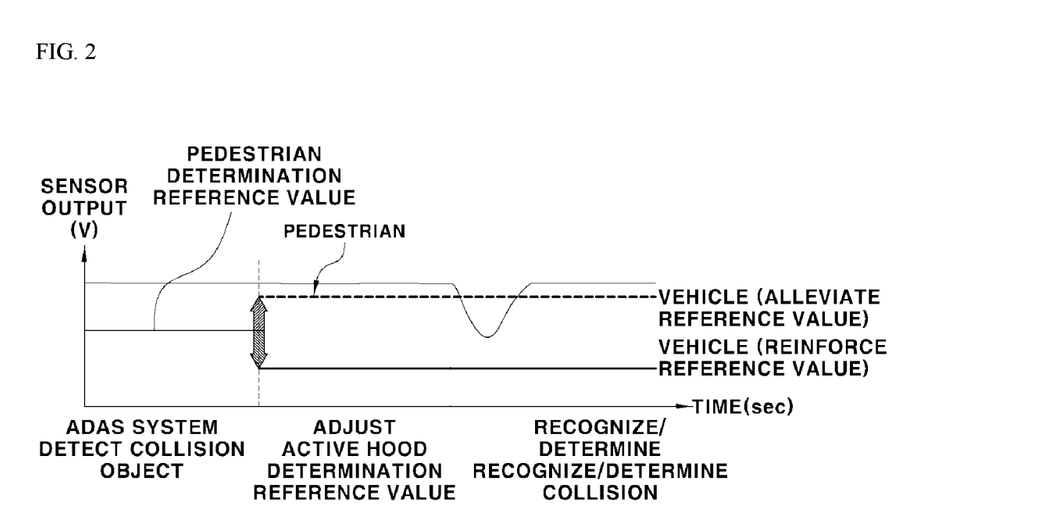
FIG. 2 is a diagram showing a reference value of a sensor output depending on an object on which an ADAS-linked active hood apparatus compensates for a PDT according to an exemplary embodiment of the present disclosure.
Figure 3:
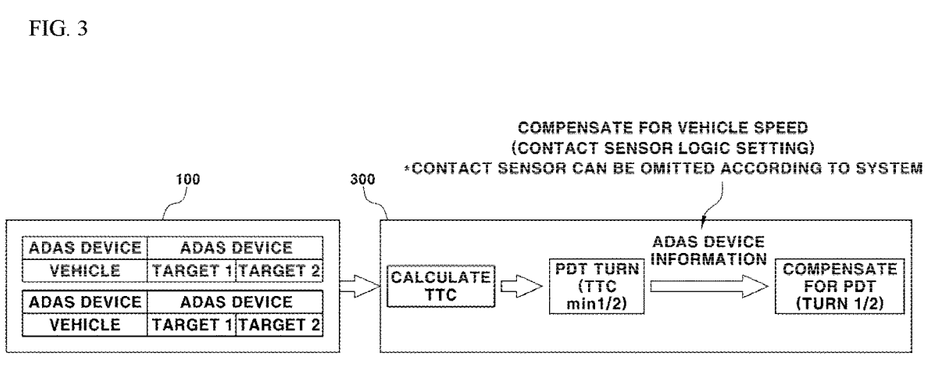
FIG. 3 is a flowchart showing PDT compensation of an ADAS-linked active hood apparatus according to an exemplary embodiment of the present disclosure.

FIG. 2 is a diagram showing the configuration of the case in which a sensor reference value is compensated for depending on an object measured by the ADAS device 100 according to an exemplary embodiment of the present disclosure. As shown in the drawing, the controller 300 may be configured to determine whether the object measured by the ADAS device 100 is a pedestrian or an object (a vehicle, etc.) that is not the pedestrian and compensate for the PDT based on information on the object. In addition, according to the compensated PDT, the controller 300 may be configured to compensate a reference value of a sensor unit, for performing pop-up of the AHLS 200 in response to a measured sensor output value.

In response to determining that the object measured by the ADAS device 100 according to the present disclosure is a pedestrian, the controller 300 may be configured to apply the reliability level of the ADAS device 100 to the margin value set through the controller 300 to compensate for the set PDT with a margin value. Accordingly, in response to predicting collision with a pedestrian, the controller 300 may be configured to have a different value between the compensated PDT and the initially set PDT. The controller 300 may be configured to compensate for an output reference value of the collision sensor unit 400 to be decreased, based on the compensated PDT, and when an output value applied to the collision sensor unit 400 is small, the controller 300 may be configured to also perform pop-up of the AHLS 200.

On the other hand, in response to determining that the object measured using the ADAS device 100 is an object that is not a pedestrian, the controller 300 may be configured to apply the reliability level of the ADAS device 100 to the margin value set through the controller 300 to compensate for the set PDT with the margin value. In particular, in response to determining that the object is not a pedestrian, the compensated PDT may be set to have a negative margin value, and the output reference value of the collision sensor unit 400 may be compensated for to be increased.

In summary, as shown in FIG. 2, the collision sensor unit 400 according to the present disclosure may be configured to output a voltage applied to the collision sensor unit 400 when collision occurs as a lower output value than an initial sensor output value when collision does not occur, and may be configured to operate the AHLS 200 when an output value output by the collision sensor unit 400 due to collision is less than a reference value for determination of a pedestrian. Accordingly, when an object is a pedestrian, the controller 300 may be configured to set the compensated reference value of the collision sensor unit 400 to be greater than an initial reference value for determination of a pedestrian, which is set by the collision sensor unit 400, and operate the AHLS 200 based on a low output value generated when collision is applied.

Differently therefrom, when an object is a non-pedestrian, the controller 300 may be configured to set the compensated reference value of the collision sensor unit 400 to be less than the initially set reference value and to set an operation reference of the AHLS 200 to be high based on an output value when collision is applied. Accordingly, the controller 300 may be configured to perform pop-up of the AHLS 200 only when an output value applied to the sensor unit is high. Depending on the object measured using the ADAS device 100, the controller 300 may be configured to compensate for the PDT and to compensate for the output reference value of the sensor unit.

Figure 4:
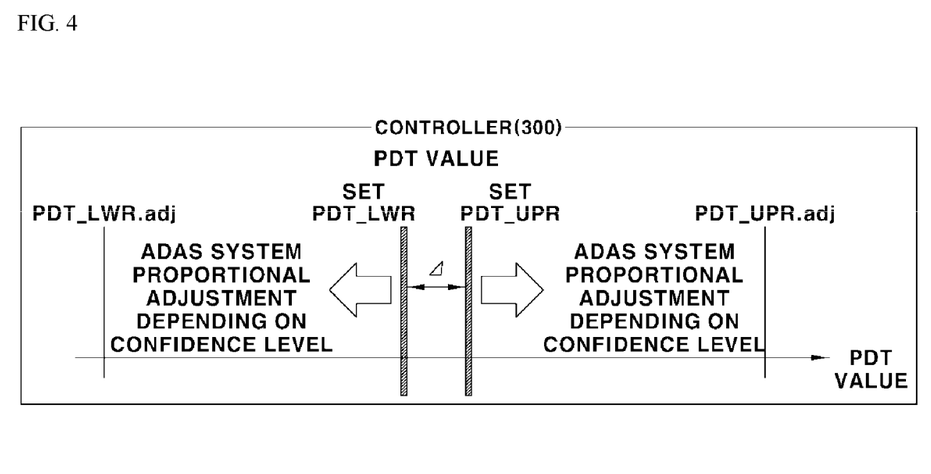
FIG. 4 is a diagram showing the configuration of compensating for a PDT when an object is a pedestrian according to an exemplary embodiment of the present disclosure.
Figure 5:
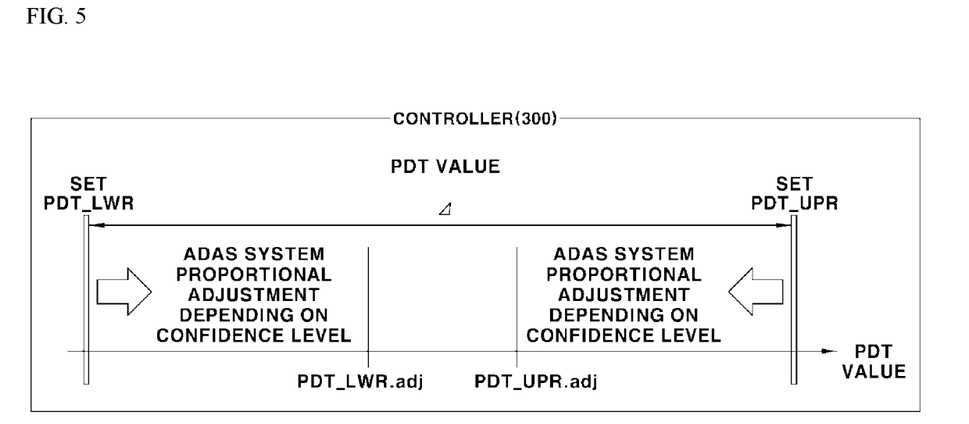
FIG. 5 is a diagram showing the configuration of compensating for a PDT when an object is not a pedestrian according to an exemplary embodiment of the present disclosure.
Figure 6:
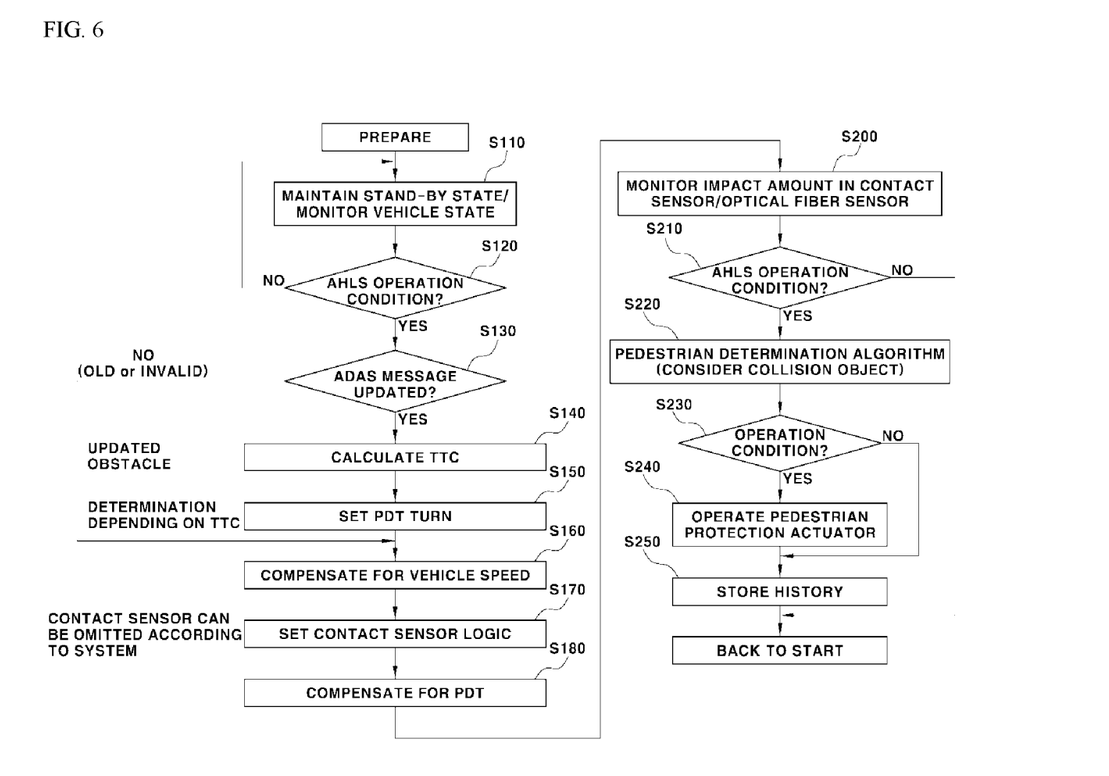
FIG. 6 is a flowchart of a method of controlling an ADAS-linked active hood apparatus according to an exemplary embodiment of the present disclosure.

FIGS. 4 to 6 are flowcharts showing the configuration of the case in which the controller 300 compensates for the PDT based on information of the ADAS device 100 according to the present disclosure. As shown in FIG. 4, the controller 300 may be configured to compensate the PDT based on information measured using the ADAS device 100. The information measured using the ADAS device 100 may include at least one of a time and distance to each object, vehicle speed after compensation (vehicle speed immediately before collision or relative speed with collision object), a position of an object in a lateral direction, and an object type (pedestrian or non-pedestrian).

The controller 300 may be configured to calculate the TTC and set PDT turns of respective objects based on the measured information of the ADAS device 100. In addition, the controller 300 may be configured to compensate for the PDT based on the information regarding an object and a vehicle, received from the ADAS device 100. In particular, the PDT compensation according to the present disclosure may be configured to compensate an initially set PDT with a margin value, and here, the margin value may be configured to apply the reliability level of the ADAS device 100 based on the information received from the ADAS device 100.

According to an exemplary embodiment of the present disclosure, the reliability level of the ADAS device 100 may be initially set to 60%, and may be configured to be compensated for according to a driving state and driving environment of a vehicle. Particularly, the reliability level of the ADAS device 100 according to the present disclosure may be configured to be compensated for according to an auto light state, and thus, the reliability level of the ADAS device 100 may be set to 50% in a light-on state, and the reliability level of the ADAS device 100 may be set to 100% in a light-off state.

The set margin value and reliability level may be configured to be calculated and to compensate for the initially set PDT, and thus, as shown in FIG. 4, when an object is a pedestrian, a positive margin value may be applied to compensate for the PDT to increase a difference value between lower and upper limits of the PDT. Accordingly, when the object is a pedestrian, the PDT may be compensated for to determine similarity with a pedestrian master waveform obtained from sensing estimation, stored in the controller 300, to be further widened.

On the other hand, as shown in FIG. 5, when an object is a non-pedestrian, a negative margin value may be applied to compensate for the PDT to reduce a difference value between lower and upper limits of the PDT. Accordingly, when the object is a non-pedestrian, the PDT may be compensated for to determine similarity with a pedestrian master waveform obtained from sensing estimation, stored in the controller 300, to be further narrowed. In other words, when the PDT is compensated for, a difference value between the set lower and upper limits may be increased or decreased, and as disclosed above, a determination range of similarity with the pedestrian master waveform may be changed to correspond to the difference value between the set lower and upper limits.

FIG. 6 is a flowchart of a method of controlling the ADAS-linked active hood apparatus 10 according to an exemplary embodiment of the present disclosure. The method described herein below may be executed by a controller. As shown, an initial state of a vehicle may be monitored (S110), and whether an operation condition of the AHLS 200 is satisfied may be determined (S120). As the operation condition of the AHLS 200 according to the present disclosure, a vehicle start-on condition or a vehicle driving start condition may be determined.

In response to determining that the operation condition of the AHLS 200 is satisfied, the controller 300 may be configured to receive information regarding whether information is updated, from the ADAS device 100 (S130). According to an exemplary embodiment of the present disclosure, the controller 300 may be configured to receive relative information between a collision object and a vehicle, such as a predicted collision order, vehicle speed after compensation, a position of an object in a lateral direction, and an object type, from the ADAS device 100.

Through the received information, the controller 300 may be configured to calculate a TTC between the object and a current vehicle (S140) and set a PDT turn (S150). After setting the PDT turn, the controller 300 may be configured to compensate for vehicle speed based on ADAS information (S160), perform contact sensor logic setting (S170), and compensate for the PDT for compensating for similarity with a pedestrian master waveform based on the compensated value (S180), and may be configured to apply a margin value to a PDT turn in consideration of the reliability level of the ADAS device 100.

Compensation of vehicle speed according to the present disclosure refers to the configuration for compensating for vehicle speed via comparison between vehicle wheel speed and vehicle speed information received from the ADAS device 100. The contact sensor logic refers to the configuration in which a compensated PDT is set differently based on a position of a contact sensor. However, when the ADAS device 100 does not update information, that is, when new information is not present or the ADAS device 100 is determined to be disabled, a margin value may be configured to be applied to the PDT turn in consideration of the reliability level of the ADAS based on already received information.

According to the illustrated exemplary embodiment, as the information received from the ADAS device 100 to compensate for the PDT, considering vehicle speed compensation (S160) and the contact sensor logic setting (S170), the PDT compensation may be configured to be performed (S180). As described above, when the PDT is compensated for based on the information received through the ADAS device 100, whether collision occurs may be monitored using an impact sensor unit (S200), and whether an operation condition of the AHLS 200 is satisfied may be determined (S210).

As the operation condition of the AHLS, when a vehicle is driven at a preset speed or greater, a reference value of a sensor unit may be compensated for according to whether an object is a pedestrian (an algorithm for determination of a pedestrian) (S220). However, when a vehicle speed is less than preset speed, the operation of the AHLS may not be performed and logic may be terminated. An output value may be determined based on an object in a state in which a reference value of the collision sensor unit 400 is compensated for, and whether the output value is equal to or greater than the reference value may be determined (S230).

When the output value is equal to or greater than the reference value, pop-up of the AHLS 200 may be performed (S240) and a history may be configured to be stored (S250), and when the output value is equal to or less than the reference value, pop-up of the AHLS 200 may not be performed the AHLS 200 and a history may be configured to be stored (S250). In other words, according to the present disclosure, the reference value of the collision sensor unit 400 may be configured to be compensated for based on the compensated PDT, and thus, when an object is a pedestrian, the reference value of the collision sensor unit 400 may be compensated for to more easily operate the AHLS 200, and when the object is a non-pedestrian, the reference value of the collision sensor unit 400 may be compensated for to make a condition for pop-up of the AHLS 200 strict (e.g. narrow the pop-up condition).

As is apparent from the above description, the following effects may be obtained by the configuration of the aforementioned components and the coupling relationship and the operation relationship between the components.

The present disclosure provides an active hood, which may be connected to and operated by an ADAS. By setting a reference value of a sensor unit for performing pop-up of the hood according to operation conditions, it may be possible to secure the safety of a pedestrian when a collision with a vehicle occurs. According to the present disclosure, a reference value of a sensor unit, for performing pop-up of an active hood, may be set depending on a collision object, thereby reducing a range in which a vehicle is damaged due to collision.

The disclosure has been described in detail with reference to exemplary embodiments thereof. However, it will be appreciated by those skilled in the art that the present disclosure may be implemented in various modifications and alterations via, for example, addition, change or omission of constituent elements without departing from the principles and spirit of the disclosure, and these modifications and alterations are included in the scope of the present disclosure. The disclosure is merely an exemplary embodiment for realizing the technical features of embodiments of the present disclosure and may be changed in various forms required in detailed applications and uses. Accordingly, the above detailed description of the present disclosure is not intended to limit the present disclosure by the disclosed embodiments, and the accompanying claims should be construed as including other embodiments.

What is claimed is:

1. An advanced driving assistance system (ADAS)-linked active hood apparatus, comprising:
    an ADAS device configured to measure information regarding a driving state of a vehicle and an object;
    a collision sensor unit positioned at a front of the vehicle and configured to measure whether collision with the object occurs;
    an active hood lift system (AHLS) configured to raise one end of a hood of the vehicle based on a signal from the collision sensor unit; and
    a controller configured to:
        set a pedestrian detection threshold (PDT) turn;
        receive information regarding a plurality of front objects from the ADAS device to compensate for a PDT;
        compensate for an output reference value of the collision sensor unit based on the compensated PDT; and
        determine whether collision occurs using the collision sensor unit to adjust pop-up of the AHLS when an output value equal to or greater than the compensated reference value is applied,
    wherein the controller is configured to compensate for the PDT using at least one piece of information of a predicted collision order measured by the ADAS device, vehicle speed after compensation, a position of the object in a lateral direction, or an object type,
    wherein the controller is configured to calculate an output value corresponding to a set margin value and a reliability level to compensate for the PDT, and
    wherein the controller is configured to decrease the output reference value of the collision sensor unit in response to recognizing a pedestrian as the object according to the set margin, and is configured to increase the output reference value of the collision sensor unit in response to recognizing a non-pedestrian as the object according to the set margin.

2. The ADAS-linked active hood apparatus of claim 1, wherein the ADAS device is configured to calculate a time to collision (TTC) to predicted collision with the measured object and detect a distance to the measured object.

3. The ADAS-linked active hood apparatus of claim 1, wherein the collision sensor unit includes at least one of an optical fiber sensor and a contact sensor that are installed in a bumper back beam of the vehicle.

4. The ADAS-linked active hood apparatus of claim 1, wherein the AHLS includes a driver to which driving force is applied; and the driver is operated to permit the hood of the vehicle to pop-up or be restored to an original position in a vertical direction by the controller.

5. The ADAS-linked active hood apparatus of claim 1, wherein the controller is configured to compensate for vehicle speed and to perform contact sensor logic during PDT compensation.

6. A method of controlling an advanced driving assistance system (ADAS)-linked active hood apparatus, comprising:
    determining, by a controller, whether an operation condition of an active hood is satisfied, based on a driving state of a vehicle;
    setting, by the controller, a time to collision (TTC) to an object and a pedestrian detection threshold (PDT) using an ADAS device in the operation condition of the active hood;
    compensating, by the controller, for the PDT using information received from the ADAS device;
    determining, by the controller, whether collision occurs; and
    adjusting, by the controller, pop-up of the active hood when collision occurs,
    wherein the controller is configured to compensate for the PDT using at least one piece of information of a predicted collision order measured by the ADAS device, vehicle speed after compensation, a position of the object in a lateral direction, or an object type,
    wherein the controller is configured to calculate an output value corresponding to a set margin value and a reliability level to compensate for the PDT, and
    wherein the controller is configured to decrease the output reference value of the collision sensor unit in response to recognizing a pedestrian as the object according to the set margin, and is configured to increase the output reference value of the collision sensor unit in response to recognizing a non-pedestrian as the object according to the set margin.

7. The method of claim 6, wherein the compensating for the PDT further includes:
    compensating, by the controller, for a reference value of a collision sensor unit based on the compensated PDT.

8. The method of claim 7, wherein, in the compensating for the reference value of the collision sensor unit based on the compensated PDT the method includes:
    decreasing, by the controller, an output reference value of the collision sensor unit in response to recognizing a pedestrian as the object; and
    increasing, by the controller, the output reference value of the collision sensor unit in response to recognizing a non-pedestrian as the object.

9. The method of claim 6, wherein, in the adjusting pop-up of the AHLS the method includes:
    adjusting, by the controller, a pop-up amount of the active hood based on a collision object measured using the ADAS device.

10. The method of claim 6, wherein setting the TTC further includes;
    compensating, by the controller, for vehicle speed; and
    compensating, by the controller, for the vehicle speed and performing contact sensor logic setting by the ADAS device.

* * * * *